US012639117B2

(12) United States Patent
Wang et al.

(10) Patent No.: US 12,639,117 B2
(45) Date of Patent: May 26, 2026

(54) METHOD, SYSTEM AND APPARATUS FOR CONFIGURING COMPUTING RESOURCE OF SERVICE

(71) Applicant: INSPUR SUZHOU INTELLIGENT TECHNOLOGY CO., LTD., Jiangsu (CN)

(72) Inventors: Chao Wang, Shandong (CN); Shaohua Wu, Shandong (CN); Qingshan Chen, Shandong (CN); Rongguo Zhang, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 587 days.

(21) Appl. No.: 18/246,481

(22) PCT Filed: Sep. 29, 2021

(86) PCT No.: PCT/CN2021/121893
§ 371 (c)(1),
(2) Date: Mar. 23, 2023

(87) PCT Pub. No.: WO2022/257301
PCT Pub. Date: Dec. 15, 2022

(65) Prior Publication Data
US 2023/0359511 A1 Nov. 9, 2023

(30) Foreign Application Priority Data
Jun. 8, 2021 (CN) .......................... 202110636996.5

(51) Int. Cl.
*G06F 9/50* (2006.01)
*G06N 3/08* (2023.01)
*G06N 7/00* (2023.01)

(52) U.S. Cl.
CPC ............ *G06F 9/5027* (2013.01); *G06F 9/505* (2013.01); *G06F 9/5072* (2013.01); *G06N 3/08* (2013.01);
(Continued)

(58) Field of Classification Search
None
See application file for complete search history.

(56) References Cited

U.S. PATENT DOCUMENTS

2019/0286486 A1* 9/2019 Ma ........................ G06F 9/5027
2021/0136006 A1 5/2021 Casey et al.
2021/0142196 A1 5/2021 R et al.

FOREIGN PATENT DOCUMENTS

CN 108037993 A 5/2018
CN 108900358 A 11/2018
(Continued)

OTHER PUBLICATIONS

Ding, et al., "QoS-aware resource matching and recommendation for cloud computing systems", Elsevier, Applied Mathematics and Computation, 2014, pp. 941-950. (Year: 2014).*
(Continued)

*Primary Examiner* — Qing Yuan Wu
(74) *Attorney, Agent, or Firm* — Dennemeyer & Associates LLC

(57) ABSTRACT

A method, system and apparatus for configuring a computing resource of a service are provided, which relate to the field of resource configuration. The method includes that: an online learning algorithm that is used for recommending, to each service on a platform, a computing resource quota adapted to a service type of the service is preset; when a new service is launched on the platform, a target computing resource quota adapted to the service type of the new service is recommended according to the online learning algorithm;
(Continued)

Preset an online learning algorithm that is used for recommending, to each service on a platform, a computing resource quota adapted to a service type of the service — S1

When a new service is launched on the platform, recommend a target computing resource quota adapted to the service type of the new service according to the online learning algorithm — S2

Perform initial configuration for a computing resource of the new service according to the target computing resource quota — S3 and initial configuration is performed for a computing resource of the new service according to the target computing resource quota.

20 Claims, 1 Drawing Sheet

(52) U.S. Cl.
CPC ............. *G06N 7/00* (2013.01); *G06F 9/5077* (2013.01); *G06F 2209/504* (2013.01)

(56) References Cited

FOREIGN PATENT DOCUMENTS

| | | | |
|---|---|---|---|
| CN | 109375506 | A | 2/2019 |
| CN | 110262899 | A | 9/2019 |
| CN | 110990159 | A | 4/2020 |
| CN | 111431996 | A | 7/2020 |
| CN | 111966504 | A | 11/2020 |
| CN | 112799817 | A | 5/2021 |
| CN | 113254213 | A | 8/2021 |

OTHER PUBLICATIONS

Moreno-Vozmediano, et al., Efficient resource provisioning for elastic Cloud services based on machine learning techniques, Springer Open, Journal of Cloud Computing: Advances, Systems and Applications, 2019, pp. 1-18. (Year: 2019).*

Search report for PCT/CN2021/121893 mailed on Mar. 10, 2022.

First search report for Chinese application 202110636996.5, filed Jun. 8, 2021.

Second search report for Chinese application 202110636996.5, filed Jun. 8, 2021.

* cited by examiner

Fig. 1

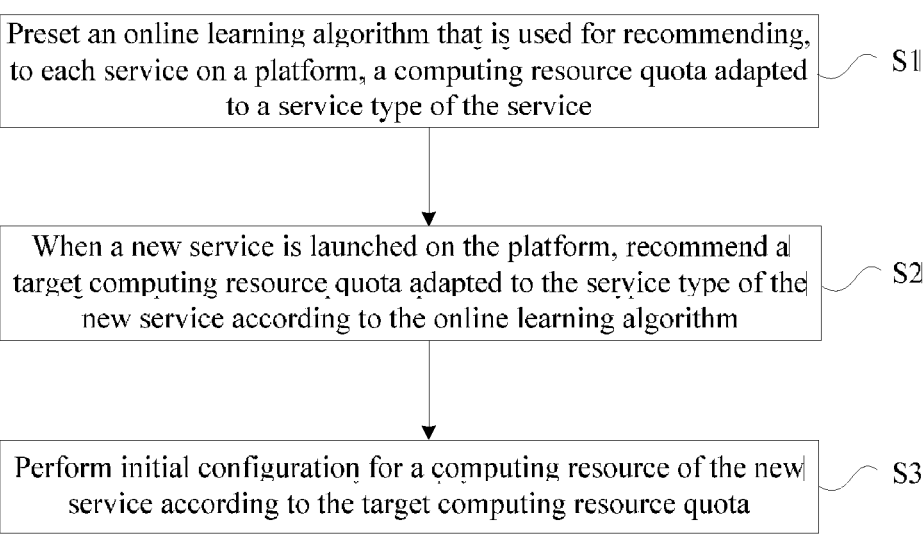

Preset an online learning algorithm that is used for recommending, to each service on a platform, a computing resource quota adapted to a service type of the service ⟋ S1

When a new service is launched on the platform, recommend a target computing resource quota adapted to the service type of the new service according to the online learning algorithm ⟋ S2

Perform initial configuration for a computing resource of the new service according to the target computing resource quota ⟋ S3

Fig. 2

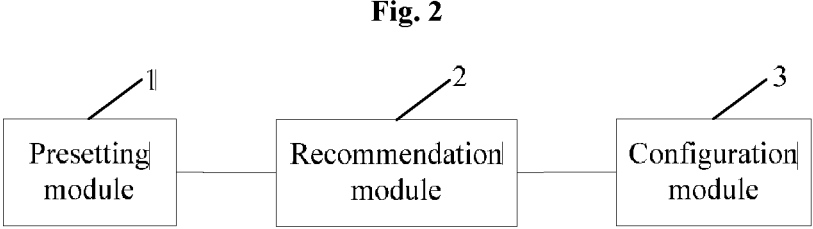

Presetting module — Recommendation module — Configuration module

METHOD, SYSTEM AND APPARATUS FOR CONFIGURING COMPUTING RESOURCE OF SERVICE

CROSS-REFERENCE TO RELATED APPLICATIONS

This is a 35 U.S.C. 371 National Stage Patent Application of International Application No. PCT/CN2021/121893, filed Sep. 29, 2021, which claims priority to Chinese application 202110636996.5, filed Jun. 8, 2021, each of which is hereby incorporated by reference in its entirety.

TECHNICAL FIELD

The present disclosure relates to the field of resource configuration, in particular to a method, system and apparatus for configuring a computing resource of a service.

BACKGROUND

Kubernetes, also known as "k8s" or "Kube", is a portable and extensible open source platform for managing containerized services (or applications). The k8s platform provides flexible capacity expansion for a service, and can dynamically increase or decrease container nodes of the service according to a certain flexible policy, so as to dynamically adjust the service processing capacity.

At present, when there are new launched services on the platform, the k8s platform may configure an initial value of a computing resource for each newly launched service on the platform according to a preset standard computing resource quota. However, the newly launched services on the platform may be of different service types, and the amounts of the computing resources actually required by the newly launched services of different service types may also be different, which leads to a problem of insufficient or excessive configuration of the computing resource in the above-mentioned fixed resource configuration method, making the configuration of the computing resource of the service irrational. Moreover, the preset standard computing resource quota is usually stored in a system memory, and all the contents stored in the memory will be lost during the "cold start" of the system, thus initial configuration of the computing resource in the "cold start" state of the service cannot be realized.

Therefore, how to provide a solution to the above-mentioned technical problem is a problem that those having ordinary skill in the art need to solve at present.

SUMMARY

Embodiments of the present disclosure provide a method, system and apparatus for configuring a computing resource of a service. A computing resource quota adapted to the service type of a newly launched service on a platform may be recommended to the newly launched service according to an online learning algorithm, so as to make computing resource configuration of the service more rational. In addition, the method for configuring the computing resource is independent of a standard computing resource quota stored in a system memory, and therefore may realize initial configuration on the resource of the service even in a "cold start" state.

In order to solve the above-mentioned technical problem, the embodiments of the present disclosure provide a method for configuring a computing resource of a service, which may include the following operations.

An online learning algorithm that is used for recommending, to each service on a platform, a computing resource quota adapted to a service type of the service is preset.

When a new service is launched on the platform, a target computing resource quota adapted to the service type of the new service is recommended according to the online learning algorithm.

Initial configuration is performed for a computing resource of the new service according to the target computing resource quota.

In some exemplary embodiments, the method for configuring the computing resource of the service may further include the following operations.

A quota optimization algorithm that is used for correspondingly computing an optimal computing resource quota of each service according to a utilization rate of the computing resource, a computing efficiency, a computing request amount and a computing request delay corresponding to each service is preset.

After the new service is put into operation, the optimal computing resource quota of the new service is computed using the quota optimization algorithm according to an actual utilization rate of the computing resource, an actual computing efficiency, an actual computing request amount and an actual computing request delay corresponding to the new service.

A quota error between the computed optimal computing resource quota and the recommended target computing resource quota is computed, and a recommendation parameter of the online learning algorithm is modified according to the quota error so as to reduce the quota error.

In some exemplary embodiments, the process of calculating the quota error between the computed optimal computing resource quota and the recommended target computing resource quota, and modifying the recommendation parameter of the online learning algorithm according to the quota error so as to reduce the quota error may include the following operations.

A loss function used for calculating the quota error corresponding to the new service is obtained according to the online learning algorithm and the quota optimization algorithm.

A target recommendation parameter of the online learning algorithm is determined using a Follow The Regularized Leader (FTRL) algorithm under a condition that a sum of all loss functions obtained is the smallest, and the recommendation parameter of the online learning algorithm is modified according to the target recommendation parameter.

In some exemplary embodiments, the quota optimization algorithm is a fuzzy logic algorithm or a neural network algorithm.

In some exemplary embodiments, the process of presetting the online learning algorithm that is used for recommending, to each service on the platform, the computing resource quota adapted to the service type of the service may include the following operations.

A Linear Upper Confidence Bound (UCB) algorithm that is used for recommending, to each service on the platform, the computing resource quota adapted to the service type of the service is preset.

According to an operation speed requirement of the Linear UCB algorithm, a computing accuracy constraint in the Linear UCB algorithm is adjusted, so that an actual operation speed of the Linear UCB algorithm meets the operation speed requirement.

In some exemplary embodiments, the process of presetting the online learning algorithm that is used for recommending, to each service on the platform, the computing resource quota adapted to the service type of the service may further include the following operations.

According to $$M_t^{-1} \leftarrow M_t^{-1} - \frac{M_t^{-1} x_a x_a^T M_t^{-1}}{x_a^T M_t^{-1} x_a + \delta},$$

an inverse operation of the Linear UCB algorithm is modified to obtain a Linear UCB algorithm with increased accuracy.

$$M_t^{-1}$$

is an inverse matrix in the Linear UCB algorithm, $$M_t^{-1}$$

is an inverse matrix of the matrix $M_t$, $x_a$ is an output value of a relational expression containing a to-be-modified inverse matrix $$M_t^{-1}, x_a^T$$

is a transpose matrix of $x_a$, t is a time point, a represents an a-th recommendation attempt, and $\delta$ is a constant.

In some exemplary embodiments, the computing resource of each service is jointly provided by a Central Processing Unit (CPU) and a Graphics Processing Unit (GPU).

The method for configuring the computing resource of the service may further include the following operations.

A copy capacity scaling algorithm used for correspondingly determining the number of service copies of each service according to a computing request amount, a remaining CPU usage amount and a remaining GPU usage amount corresponding to each service is preset.

After the new service is put into operation, the number of target service copies of the new service is determined using the copy capacity scaling algorithm according to an actual computing request amount, an actual remaining CPU usage amount and an actual remaining GPU usage amount corresponding to the new service.

Capacity scaling processing is performed on service copies of the new service according to the number of the target service copies.

In order to solve the above-mentioned technical problem, the embodiments of the present disclosure further provide a system for configuring a computing resource of a service, which may include: a presetting module, a recommendation module and a configuration module.

The presetting module is configured to preset an online learning algorithm that is used for recommending, to each service on a platform, a computing resource quota adapted to a service type of the service.

The recommendation module is configured to recommend, when a new service is launched on the platform, a target computing resource quota adapted to the service type of the new service according to the online learning algorithm.

The configuration module is configured to perform initial configuration for a computing resource of the new service according to the target computing resource quota.

In some exemplary embodiments, the presetting module is configured to perform the following operations.

A UCB algorithm that is used for recommending, to each service on the platform, the computing resource quota adapted to the service type of the service is preset.

According to an operation speed requirement of the Linear UCB algorithm, a computing accuracy constraint in the Linear UCB algorithm is adjusted, so that an actual operation speed of the Linear UCB algorithm meets the operation speed requirement.

The presetting module is also configured to perform the following operations.

According to $$M_t^{-1} \leftarrow M_t^{-1} - \frac{M_t^{-1} x_a x_a^T M_t^{-1}}{x_a^T M_t^{-1} x_a + \delta},$$

an inverse operation of the Linear UCB algorithm is modified to obtain a Linear UCB algorithm with increased accuracy.

$$M_t^{-1}$$

is an inverse matrix in the Linear UCB algorithm, $$M_t^{-1}$$

is an inverse matrix of the matrix $M_t$, $x_a$ is an output value of a relational expression containing a to-be-modified inverse matrix $$M_t^{-1}, x_a^T$$

is a transpose matrix of $M_t$, t is a time point, a represents an a-th recommendation attempt, and $\delta$ is a constant.

In order to solve the above-mentioned technical problem, the embodiments of the present disclosure further provide an apparatus for configuring a computing resource of a service, which may include: a memory and a processor.

The memory is configured to store a computer program.

The processor is configured to implement the steps of any method for configuring the computing resource of the service as described above when executing the computer program.

The embodiments of the present disclosure provide the method for configuring the computing resource of the service. The online learning algorithm that is used for recommending, to each service on a platform, the computing resource quota adapted to the service type of the service is preset; when the new service is launched on the platform, the target computing resource quota adapted to the service type of the new service is recommended according to the online learning algorithm; and the initial configuration is performed for a computing resource of the new service according to the target computing resource quota. In the embodiments of the present disclosure, the computing resource quota adapted to the service type of a newly launched service on the platform may be recommended to the newly launched service according to the online learning algorithm, so as to make computing resource configuration of the service more rational. In addition, the method is independent of a standard computing resource quota stored in a system memory, and therefore may realize initial configuration on the resource of the service even in a "cold start" state.

The embodiments of the present disclosure further provide a system and apparatus for configuring a computing resource of a service, which have the same beneficial effects as the above-mentioned configuration method.

BRIEF DESCRIPTION OF THE DRAWINGS

In order to more clearly explain the technical solutions in the embodiments of this application, the drawings required in the descriptions of a related art and the embodiments will be briefly introduced below. It is apparent that the drawings in the following descriptions are only some embodiments of this application. Those having ordinary skill in the art may also obtain other drawings in accordance with these drawings without creative efforts.

FIG. 1 is a flowchart of a method for configuring a computing resource of a service according to the embodiments of the present disclosure.

FIG. 2 is a structural schematic diagram of a system for configuring a computing resource of a service according to the embodiments of the present disclosure.

DETAILED DESCRIPTION

The embodiments of the present disclosure provide a method, system and apparatus for configuring a computing resource of a service. A computing resource quota adapted to the service type of a newly launched service on a platform may be recommended to the newly launched service according to an online learning algorithm, so as to make computing resource configuration of the service more rational. In addition, the method for configuring the computing resource is independent of a standard computing resource quota stored in a system memory, and therefore may realize initial configuration on the resource of the service even in a "cold start" state.

In order to make the purposes, technical solutions and advantages of the embodiments of the present disclosure more clear, the technical solutions in the embodiments of the present disclosure will be clearly and completely described below in combination with the drawings in the embodiments of the present disclosure. It is apparent that the described embodiments are only a part rather all of embodiments of the present disclosure. On a basis of the embodiments in the present disclosure, all other embodiments obtained by those having ordinary skill in the technical field without creative efforts fall into the scope of protection of the present disclosure.

Referring to FIG. 1, FIG. 1 is a flowchart of a method for configuring a computing resource of a service according to the embodiments of the present disclosure.

The method for configuring the computing resource of the service includes the following operations.

At S1, an online learning algorithm that is used for recommending, to each service on a platform, a computing resource quota adapted to a service type of the service is preset.

In some exemplary embodiments, the solution provided in the embodiments of the present disclosure sets up an online learning algorithm for each service on the platform in advance. The online learning algorithm is used for recommending, to each service on the platform, the computing resource quota adapted to the service type of the service. That is, input of the online learning algorithm is a platform service (i.e., a service on the platform), and output of the online learning algorithm is the computing resource quota adapted to the service type of the input platform service.

It is to be noted that before the online learning algorithm is applied, a recommendation parameter (one or more recommendation parameters) in the online learning algorithm needs to be trained through some samples (samples formed by each historical service on the platform and the computing resource quota adapted to the historical service), so that the online learning algorithm can recommend, to each service on the platform, the computing resource quota better adapted to the service type of the service.

In some further exemplary embodiments, the process of training the recommendation parameter in the online learning algorithm includes the following operations. The historical service on the platform is taken as the input of the online learning algorithm to obtain the output of the online learning algorithm, which is a recommended computing resource quota adapted to the service type of the input historical service on the platform. A quota error between the recommended computing resource quota output by the online learning algorithm and the computing resource quota given in the sample and adapted to the service type of the input historical service on the platform is determined. According to the quota error, the recommendation parameter of the online learning algorithm is modified so as to reduce the quota error and make the computing resource quota recommended by the online learning algorithm more accurate.

At S2, when a new service is launched on the platform, a target computing resource quota adapted to the service type of the new service is recommended according to the online learning algorithm.

In some exemplary embodiments, when the new service is launched on the platform, the computing resource quota (called the target computing resource quota) adapted to the service type of the new service may be recommended according to the online learning algorithm, so as to provide a basis for the initial configuration of a computing resource of the new service.

At S3, initial configuration is performed for the computing resource of the new service according to the target computing resource quota.

In some exemplary embodiments, after the target computing resource quota adapted to the service type of the new service is recommended according to the online learning algorithm, the initial configuration is performed for the computing resource of the new service according to the recommended target computing resource quota, so that the configuration of the computing resource of the service is more rational.

The embodiments of the present disclosure provide a method for configuring the computing resource of the service. The online learning algorithm that is used for recommending, to each service on the platform, the computing resource quota adapted to the service type of the service is preset; when the new service is launched on the platform, the target computing resource quota adapted to the service type of the new service is recommended according to the online learning algorithm; and the initial configuration is performed for the computing resource of the new service according to the target computing resource quota. In the embodiments of the present disclosure, the computing resource quota adapted to the service type of the newly launched service on the platform may be recommended to the newly launched service according to the online learning algorithm, so as to make computing resource configuration of the service more rational. In addition, the method is independent of a standard computing resource quota stored in a system memory, and therefore may realize initial configuration on the resource of the service even in a "cold start" state.

On the basis of the above embodiment, as an exemplary embodiment, the method for configuring the computing resource of the service may further include the following operations.

A quota optimization algorithm that is used for correspondingly computing an optimal computing resource quota of each service according to a utilization rate of the computing resource, a computing efficiency, a computing request amount and a computing request delay corresponding to each service is preset.

After the new service is put into operation, the optimal computing resource quota of the new service is computed using the quota optimization algorithm according to an actual utilization rate of the computing resource, an actual computing efficiency, an actual computing request amount and an actual computing request delay corresponding to the new service.

The quota error between the computed optimal computing resource quota and the recommended target computing resource quota is calculated, and the recommendation parameter of the online learning algorithm is modified according to the quota error so as to reduce the quota error.

Furthermore, in the embodiments of the present disclosure, not only the recommendation parameter of the online learning algorithm is trained through some samples before the online learning algorithm is applied, but also the recommendation parameter of the online learning algorithm is trained online after the online learning algorithm is applied to the recommendation of the computing resource quota of the platform service.

The solution of the embodiments of the present disclosure sets up a quota optimization algorithm for computing the optimal computing resource quota of each service in advance. Considering that the computing resource quota corresponding to any service has a certain relationship with the utilization rate of the computing resource, the computing efficiency, the computing request amount and the computing request delay corresponding to the service, the quota optimization algorithm set in the embodiments of the present disclosure is used for correspondingly computing the optimal computing resource quota of each service according to the utilization rate of the computing resource, the computing efficiency, the computing request amount and the computing request delay corresponding to each service.

After the new service launched on the platform is put into operation, in the embodiments of the present disclosure, the optimal computing resource quota of the new service is computed, using the quota optimization algorithm set in advance, according to an actual utilization rate of the computing resource, an actual computing efficiency, an actual computing request amount and an actual computing request delay corresponding to the new service. It is to be understood that an optimization goal of the recommendation of the online learning algorithm is that: the target computing resource quota recommended by the online learning algorithm to the new service is as close as possible to the optimal computing resource quota of the new service computed by the quota optimization algorithm.

Based thereon, the solution provided in the embodiments of the present disclosure calculates the quota error between the optimal computing resource quota of the new service computed by the quota optimization algorithm and the target computing resource quota recommended by the online learning algorithm to the new service, and then modifies the recommendation parameter of the online learning algorithm according to the quota error so as to reduce the quota error and make the computing resource quota recommended by the online learning algorithm more accurate.

As an exemplary embodiment, the process of calculating the quota error between the computed optimal computing resource quota and the recommended target computing resource quota, and modifying the recommendation parameter of the online learning algorithm according to the quota error so as to reduce the quota error includes the following operations.

A loss function used for calculating the quota error corresponding to the new service is obtained according to the online learning algorithm and the quota optimization algorithm.

A target recommendation parameter of the online learning algorithm is determined using an FTRL algorithm under a condition that a sum of all loss functions obtained is the smallest, and the recommendation parameter of the online learning algorithm is modified according to the target recommendation parameter.

In some exemplary embodiments, the online learning algorithm is used for recommending, to each service on the platform, the computing resource quota adapted to the service type of the service. That is, the output of the online learning algorithm is the computing resource quota recommended to the platform service, and the quota optimization algorithm is used for computing the optimal computing resource quota of each service. That is, the output of the quota optimization algorithm is the optimal computing resource quota computed for the platform service. It is to be understood that for any platform service, the loss function for calculating the quota error corresponding to the platform service is obtained by subtracting the online learning algorithm corresponding to the platform service from the quota optimization algorithm corresponding to the platform service.

Based thereon, every time a new service is launched on the platform, the loss function for calculating the quota error corresponding to the new service may be obtained. The basis for adjusting the recommendation parameter of the online learning algorithm is that the recommendation parameter of the online learning algorithm (called the target recommendation parameter) is acquired under a condition that a sum of all loss functions obtained is the smallest, and the recommendation parameter of the online learning algorithm is modified according to the acquired target recommendation parameter.

In some further exemplary embodiments, considering that the FTRL algorithm has excellent performance in coping with a convex optimization problem with a non-smooth regularization term such as logistic regression, the solution provided in the embodiments of the present disclosure uses the FTRL algorithm to determine the target recommendation parameter of the online learning algorithm under a condition that the sum of all loss functions obtained is the smallest, and therefore has a good effect.

As an exemplary embodiment, the quota optimization algorithm is a fuzzy logic algorithm or a neural network algorithm.

In some exemplary embodiments, the quota optimization algorithm in the embodiments of the present disclosure may be the fuzzy logic algorithm or the neural network algorithm, which is not particularly limited in the embodiments of the present disclosure. It is to be noted that the fuzzy logic algorithm or the neural network algorithm needs to be trained and set up in advance according to a computing purpose (the optimal computing resource quota of any service is computed according to the utilization rate of the computing resource, the computing efficiency, the computing request amount and the computing request delay), so that the operation that the optimal computing resource quota of each service is correspondingly computed according to the utilization rate of the computing resource, the computing efficiency, the computing request amount and the computing request delay corresponding to each service is subsequently realized using the fuzzy logic algorithm or the neural network algorithm.

As an exemplary embodiment, the process of presetting the online learning algorithm that is used for recommending, to each service on the platform, the computing resource quota adapted to the service type of the service includes the following operations.

A linear UCB algorithm that is used for recommending, to each service on the platform, the computing resource quota adapted to the service type of the service is preset.

According to an operation speed requirement of the Linear UCB algorithm, a computing accuracy constraint in the Linear UCB algorithm is adjusted, so that an actual operation speed of the Linear UCB algorithm meets the operation speed requirement.

The solution provided in the embodiments of the present disclosure uses the Linear UCB algorithm to recommend, to each service on the platform, the computing resource quota adapted to the service type of the service. The Linear UCB algorithm considers, on the premise of a UCB algorithm, a linear relationship between reward and features, selects and recommends an item with the largest UCB and updates a parameter of the linear relationship after observing the reward, so as to achieve the purpose of online learning.

In addition, considering that there are many inverse operations of matrix inversion in the Linear UCB algorithm, and the time complexity of the matrix inversion is the third power of an original matrix dimension, the time cost of the inverse operation of the matrix inversion is large, which leads to slow operation speed of the Linear UCB algorithm. Meanwhile, considering that the lower the computing accuracy constraint in the Linear UCB algorithm is, the faster the operation speed of the Linear UCB algorithm is, the solution provided in the embodiments of the present disclosure may properly adjust the computing accuracy constraint in the Linear UCB algorithm in the case where there is the operation speed requirement of the Linear UCB algorithm, so that the actual operation speed of the Linear UCB algorithm meets the operation speed requirement.

As an exemplary embodiment, the process of presetting the online learning algorithm that is used for recommending, to each service on the platform, the computing resource quota adapted to the service type of the service may further include the following operations.

According to $$M_t^{-1} \leftarrow M_t^{-1} - \frac{M_t^{-1} x_a x_a^T M_t^{-1}}{x_a^T M_t^{-1} x_a + \delta},$$

the inverse operation of the Linear UCB algorithm is modified to obtain a Linear UCB algorithm with increased accuracy.

$$M_t^{-1}$$

is an inverse matrix in the Linear UCB algorithm, $$M_t^{-1}$$

is an inverse matrix of the matrix $M_t$, $x_a$ is an output value of a relational expression containing a to-be-modified inverse matrix $$M_t^{-1}, x_a^T$$

is a transpose matrix of $x_a$, t is a time point, a represents an a-th recommendation attempt, and $\delta$ is a constant.

Furthermore, considering that the computing accuracy constraint in the Linear UCB algorithm is reduced, although the operation speed of the Linear UCB algorithm is accelerated, the recommendation of the Linear UCB algorithm is not accurate enough, so the embodiments of the present disclosure provide a method to improve the recommendation accuracy of the Linear UCB algorithm without affecting the computing speed. In the method, the inverse matrix $$M_t^{-1},$$

in the Linear UCB algorithm is replaced with $$M_t^{-1} - \frac{M_t^{-1} x_a x_a^T M_t^{-1}}{x_a^T M_t^{-1} x_a + \delta}.$$

$x_a$ is the output value of the relational expression containing the to-be-replaced inverse matrix $$M_t^{-1},$$

and $\delta$ is a constant and may be equal to, for example, 1.

As an exemplary embodiment, the computing resource of each service is jointly provided by a CPU and a GPU.

The method for configuring the computing resource of the service may further include the following operations.

A copy capacity scaling algorithm used for correspondingly determining the number of service copies of each service according to a computing request amount, a remaining CPU usage amount and a remaining GPU usage amount corresponding to each service is preset.

After the new service is put into operation, the number of target service copies of the new service is determined using the copy capacity scaling algorithm according to an actual computing request amount, an actual remaining CPU usage amount and an actual remaining GPU usage amount corresponding to the new service.

Capacity scaling processing is performed on service copies of the new service according to the number of the target service copies.

Furthermore, the computing resource of the platform service in the embodiments of the present disclosure is jointly provided by the CPU and the GPU.

There is a certain relationship between the number of service copies of the platform service and the computing request amount. In some exemplary embodiments, the computing request amount that one service copy can support is fixed, and when the computing request amount of the platform service increases to a point where the service copy of the platform service cannot support, it is necessary to increase the number of the service copies to support the increased computing request amount. There is a certain relationship between the number of the service copies of the platform service and the remaining CPU usage amount of the platform service. In some exemplary embodiments, when the remaining CPU usage amount corresponding to the platform service is insufficient, the platform service may apply for a new CPU. At this time, the remaining CPU usage amount corresponding to the platform service is sufficient, and the number of the service copies of the platform service may be increased. For example, if one CPU is provided with 12 cores and one core may be used for one service copy, up to 12 service copies may be increased for the newly applied CPU. There is a certain relationship between the number of the service copies of the platform service and the remaining GPU usage amount of the platform service. In some exemplary embodiments, when the remaining GPU usage amount corresponding to the platform service is insufficient, the platform service may apply for a new GPU card. At this time, the remaining GPU usage amount corresponding to the platform service is sufficient, and the number of the service copies of the platform service may be increased. For example, if one GPU card may be used by one service copy, one service copy may be increased for the newly applied CPU.

Based thereon, the solution provided in the embodiments of the present disclosure sets up the copy capacity scaling algorithm for determining the number of the service copies of each service in advance. The copy capacity scaling algorithm is used for correspondingly determining the copy capacity scaling algorithm of the number of the service copies of each service according to the computing request amount, the remaining CPU usage amount and the remaining GPU usage amount corresponding to each service. After the new service launched on the platform is put into operation, the number of the service copies (called the number of the target service copies) of the new service is determined using the copy capacity scaling algorithm according to an actual computing request amount, an actual remaining CPU usage amount and an actual remaining GPU usage amount corresponding to the new service.

Referring to FIG. 2, FIG. 2 is a structural schematic diagram of a system for configuring a computing resource of a service according to the embodiments of the present disclosure.

The system for configuring the computing resource of the service includes: a presetting module 1, a recommendation module 2 and a configuration module 3.

The presetting module 1 is configured to preset an online learning algorithm that is used for recommending, to each service on a platform, a computing resource quota adapted to a service type of the service.

The recommendation module 2 is configured to recommend, when a new service is launched on the platform, a target computing resource quota adapted to the service type of the new service according to the online learning algorithm.

The configuration module 3 is configured to perform initial configuration for a computing resource of the new service according to the target computing resource quota.

As an exemplary embodiment, the system for configuring the computing resource of the service may further include: an optimization algorithm module, an optimization computing module and a parameter modification module.

The optimization algorithm module is configured to preset a quota optimization algorithm that is used for correspondingly computing an optimal computing resource quota of each service according to a utilization rate of the computing resource, a computing efficiency, a computing request amount and a computing request delay corresponding to each service.

The optimization computing module is configured to compute, after the new service is put into operation, the optimal computing resource quota of the new service using the quota optimization algorithm according to an actual utilization rate of the computing resource, an actual computing efficiency, an actual computing request amount and an actual computing request delay corresponding to the new service.

The parameter modification module is configured to calculate a quota error between the computed optimal computing resource quota and the recommended target computing resource quota, and modify the recommendation parameter of the online learning algorithm according to the quota error so as to reduce the quota error.

As an exemplary embodiment, the parameter modification module is configured to perform the following operations.

A loss function used for calculating the quota error corresponding to the new service is obtained according to the online learning algorithm and the quota optimization algorithm.

A target recommendation parameter of the online learning algorithm is determined using an FTRL algorithm under a condition that a sum of all loss functions obtained is the smallest, and the recommendation parameter of the online learning algorithm is modified according to the target recommendation parameter.

As an exemplary embodiment, the presetting module 1 is configured to perform the following operations.

A Linear UCB algorithm that is used for recommending, to each service on the platform, the computing resource quota adapted to the service type of the service is preset.

According to an operation speed requirement of the Linear UCB algorithm, a computing accuracy constraint in the Linear UCB algorithm is adjusted, so that an actual operation speed of the Linear UCB algorithm meets the operation speed requirement.

As an exemplary embodiment, the presetting module 1 is further configured to perform the following operations.

According to $$M_t^{-1} \leftarrow M_t^{-1} - \frac{M_t^{-1} x_a x_a^T M_t^{-1}}{x_a^T M_t^{-1} x_a + \delta},$$

an inverse operation of the Linear UCB algorithm is modified to obtain a Linear UCB algorithm with increased accuracy.

$$M_t^{-1}$$

is an inverse matrix in the Linear UCB algorithm, $$M_t^{-1}$$

is an inverse matrix of the matrix $M_t$, $x_a$ is an output value of a relational expression containing a to-be-modified inverse matrix $$M_t^{-1}, x_a^T$$

is a transpose matrix of $x_a$, t is a time point, a represents an a-th recommendation attempt, and $\delta$ is a constant.

As an exemplary embodiment, the computing resource of each service is jointly provided by a CPU and a GPU.

The system for configuring the computing resource of the service may further include: a copy algorithm module, a copy computing module and a copy capacity scaling module.

The copy algorithm module is configured to preset a copy capacity scaling algorithm used for correspondingly determining the number of service copies of each service according to a computing request amount, a remaining CPU usage amount and a remaining GPU usage amount corresponding to each service.

The copy computing module is configured to determine, after the new service is put into operation, the number of target service copies of the new service using the copy capacity scaling algorithm according to an actual computing request amount, an actual remaining CPU usage amount and an actual remaining GPU usage amount corresponding to the new service.

The copy capacity scaling module is configured to perform capacity scaling processing on service copies of the new service according to the number of the target service copies.

The description of the configuration system provided by the embodiments of the present disclosure may be referred to the above-mentioned embodiments of the configuration method, which is not repeated here in the embodiments of the present disclosure.

The embodiments of the present disclosure also provide an apparatus for configuring a computing resource of a service, which includes: a memory and a processor.

The memory is configured to store a computer program.

The processor is configured to implement the steps of any method for configuring the computing resource of the service as described above when executing the computer program.

The description of the configuration apparatus provided by the present disclosure may be referred to the above-mentioned embodiments of the configuration method, which is not repeated here in the embodiments of the present disclosure.

It is to be noted that relational terms such as first and second herein are only used to distinguish one entity or operation from another entity or operation, and do not necessarily require or imply any such actual relationship or sequence between these entities or operations. Moreover, terms "include" and "contain" or any other variant are intended to cover nonexclusive inclusions herein, so that a process, method, goods or device including a series of elements not only includes those elements but also includes other elements which are not clearly listed or may further include elements intrinsic to a process, a method, article or device. Under the condition of no more limitations, an element defined by the statement "including a/an . . . " does not exclude existence of the same other elements in a process, method, article or device including the element.

The above-mentioned description of the disclosed embodiments enables those having ordinary skill in the art to make or use the present disclosure. Multiple modifications to these embodiments are apparent to those having ordinary skill in the art, and the general principles defined herein can be implemented in other embodiments without departing from the spirit or scope of the present disclosure. Therefore, the present disclosure will not be limited to these embodiments shown herein, but is to be incorporated into the widest scope consistent with the principles and novel features disclosed herein.

What is claimed is:

1. A method for configuring a computing resource of a service, comprising:

presetting an online learning algorithm that is used for recommending, to each service on a platform, a computing resource quota adapted to a service type of the service;

recommending, when a new service is launched on the platform during a cold start state in which a preset standard computing resource quota is not stored in a system memory, a target computing resource quota adapted to the service type of the new service according to the online learning algorithm, wherein the preset standard computing resource quota is configured to configure an initial value of a computing resource for the new service launched on the platform; and performing initial configuration for a computing resource of the new service according to the target computing resource quota;

wherein the platform is a Kubernetes platform configured to manage containerized services, the containerized services comprise the new service, and the computing resource of the new service is jointly provided by a Central Processing Unit (CPU) and a Graphics Processing Unit (GPU).

2. The method for configuring the computing resource of the service according to claim 1, wherein the method for configuring the computing resource of the service further comprises:

presetting a quota optimization algorithm that is used for correspondingly computing an optimal computing resource quota of each service according to a utilization rate of the computing resource, a computing efficiency, a computing request amount and a computing request delay corresponding to each service;

computing, after the new service is put into operation, the optimal computing resource quota of the new service using the quota optimization algorithm according to an actual utilization rate of the computing resource, an actual computing efficiency, an actual computing request amount and an actual computing request delay corresponding to the new service; and calculating a quota error between the computed optimal computing resource quota and the recommended target computing resource quota, and modifying a recommendation parameter of the online learning algorithm according to the quota error so as to reduce the quota error.

3. The method for configuring the computing resource of the service according to claim 2, wherein calculating the quota error between the computed optimal computing resource quota and the recommended target computing resource quota, and modifying the recommendation parameter of the online learning algorithm according to the quota error so as to reduce the quota error comprises:

obtaining, according to the online learning algorithm and the quota optimization algorithm, a loss function used for calculating the quota error corresponding to the new service; and determining a target recommendation parameter of the online learning algorithm using a Follow The Regularized Leader (FTRL) algorithm under a condition that a sum of all loss functions obtained is the smallest, and modifying the recommendation parameter of the online learning algorithm according to the target recommendation parameter.

4. The method for configuring the computing resource of the service according to claim 3, wherein obtaining, according to the online learning algorithm and the quota optimization algorithm, the loss function used for calculating the quota error corresponding to the new service comprises:

obtaining the loss function used for calculating the quota error corresponding to the new service by subtracting the online learning algorithm corresponding to the new service from the quota optimization algorithm corresponding to the new service.

5. The method for configuring the computing resource of the service according to claim 2, wherein the quota optimization algorithm is a fuzzy logic algorithm or a neural network algorithm.

6. The method for configuring the computing resource of the service according to claim 1, wherein presetting the online learning algorithm that is used for recommending, to each service on the platform, the computing resource quota adapted to the service type of the service comprises:

presetting a Linear Upper Confidence Bound (UCB) algorithm that is used for recommending, to each service on the platform, the computing resource quota adapted to the service type of the service; and adjusting, according to an operation speed requirement of the Linear UCB algorithm, a computing accuracy constraint in the Linear UCB algorithm, so that an actual operation speed of the Linear UCB algorithm meets the operation speed requirement.

7. The method for configuring the computing resource of the service according to claim 6, wherein presetting the online learning algorithm that is used for recommending, to each service on the platform, the computing resource quota adapted to the service type of the service further comprises:

modifying, according to $$M_t^{-1} \leftarrow M_t^{-1} - \frac{M_t^{-1} x_a x_a^T M_t^{-1}}{x_a^T M_t^{-1} x_a + \delta},$$

an inverse operation of the Linear UCB algorithm to obtain a Linear UCB algorithm with increased accuracy, wherein $$M_t^{-1}$$

is an inverse matrix in the Linear UCB algorithm, $$M_t^{-1}$$

is an inverse matrix of a matrix $M_t^{-1}$, $x_a$ is an output value of a relational expression containing a to-be-modified inverse matrix $$M_t^{-1},$$

$$x_a^T$$

is a transpose matrix of $x_a$, t is a time point, a represents ath recommendation attempt, and $\delta$ is a constant.

8. The method for configuring the computing resource of the service according to claim 1, wherein the method for configuring the computing resource of the service further comprises:

presetting a copy capacity scaling algorithm used for correspondingly determining the number of service copies of the new service according to a computing request amount, a remaining CPU usage amount and a remaining GPU usage amount corresponding to the new service;

determining, after the new service is put into operation, the number of target service copies of the new service using the copy capacity scaling algorithm according to an actual computing request amount, an actual remaining CPU usage amount and an actual remaining GPU usage amount corresponding to the new service; and performing capacity scaling processing on service copies of the new service according to the number of the target service copies.

9. The method for configuring the computing resource of the service according to claim 1, wherein before the online learning algorithm is applied, the method for configuring the computing resource of the service further comprises:

training a recommendation parameter in the online learning algorithm through samples, wherein each samples is formed by a historical service on the platform and the computing resource quota adapted to the historical service.

10. The method for configuring the computing resource of the service according to claim 9, wherein training the recommendation parameter in the online learning algorithm through the samples comprises:

taking the historical service on the platform as input of the online learning algorithm to obtain output of the online learning algorithm, wherein the output is a recommended computing resource quota adapted to the service type of the input historical service on the platform;

determining a quota error between the recommended computing resource quota output by the online learning algorithm and the computing resource quota given in the sample and adapted to the service type of the input historical service on the platform;

modifying, according to the quota error, the recommendation parameter of the online learning algorithm to reduce the quota error.

11. An apparatus for configuring a computing resource of a service, comprising:

a memory, configured to store a computer program; and a processor, configured to implement following operations when executing the computer program:

presetting an online learning algorithm that is used for recommending, to each service on a platform, a computing resource quota adapted to a service type of the service;

recommending, when a new service is launched on the platform during a cold start state in which a preset standard computing resource quota is not stored in a system memory, a target computing resource quota adapted to the service type of the new service according to the online learning algorithm, wherein the preset standard computing resource quota is configured to configure an initial value of a computing resource for the new service launched on the platform; and performing initial configuration for a computing resource of the new service according to the target computing resource quota;

wherein the platform is a Kubernetes platform configured to manage containerized services, the containerized services comprise the new service, and the computing resource of the new service is jointly provided by a Central Processing Unit (CPU) and a Graphics Processing Unit (GPU).

12. The apparatus for configuring the computing resource of the service according to claim 11, wherein the processor is configured to further implement following operations when executing the computer program:

presetting a quota optimization algorithm that is used for correspondingly computing an optimal computing resource quota of each service according to a utilization rate of the computing resource, a computing efficiency, a computing request amount and a computing request delay corresponding to each service;

computing, after the new service is put into operation, the optimal computing resource quota of the new service using the quota optimization algorithm according to an actual utilization rate of the computing resource, an actual computing efficiency, an actual computing request amount and an actual computing request delay corresponding to the new service; and calculating a quota error between the computed optimal computing resource quota and the recommended target computing resource quota, and modifying a recommendation parameter of the online learning algorithm according to the quota error so as to reduce the quota error.

13. The apparatus for configuring the computing resource of the service according to claim 12, wherein the processor is configured to implement following operations when calculating the quota error between the computed optimal computing resource quota and the recommended target computing resource quota, and modifying the recommendation parameter of the online learning algorithm according to the quota error so as to reduce the quota error:

obtaining, according to the online learning algorithm and the quota optimization algorithm, a loss function used for calculating the quota error corresponding to the new service; and determining a target recommendation parameter of the online learning algorithm using a Follow The Regularized Leader (FTRL) algorithm under a condition that a sum of all loss functions obtained is the smallest, and modifying the recommendation parameter of the online learning algorithm according to the target recommendation parameter.

14. The apparatus for configuring the computing resource of the service according to claim 13, wherein the processor is configured to further implement following operations when obtaining, according to the online learning algorithm and the quota optimization algorithm, the loss function used for calculating the quota error corresponding to the new service:

obtaining the loss function used for calculating the quota error corresponding to the new service by subtracting the online learning algorithm corresponding to the new service from the quota optimization algorithm corresponding to the new service.

15. The apparatus for configuring the computing resource of the service according to claim 11, wherein the processor is configured to implement following operations when presetting the online learning algorithm that is used for recommending, to each service on the platform, the computing resource quota adapted to the service type of the service:

presetting a Linear Upper Confidence Bound (UCB) algorithm that is used for recommending, to each service on the platform, the computing resource quota adapted to the service type of the service; and adjusting, according to an operation speed requirement of the Linear UCB algorithm, a computing accuracy constraint in the Linear UCB algorithm, so that an actual operation speed of the Linear UCB algorithm meets the operation speed requirement.

16. The apparatus for configuring the computing resource of the service according to claim 15, wherein the process is further configured to implement following operations when presetting the online learning algorithm that is used for recommending, to each service on the platform, the computing resource quota adapted to the service type of the service:

modifying, according to $$M_t^{-1} \leftarrow M_t^{-1} - \frac{M_t^{-1} x_a x_a^T M_t^{-1}}{x_a^T M_t^{-1} x_a + \delta},$$

an inverse operation of the Linear UCB algorithm to obtain a Linear UCB algorithm with increased accuracy, wherein $$M_t^{-1}$$

is an inverse matrix in the Linear UCB algorithm, $$M_t^{-1}$$

is an inverse matrix of a matrix $M_t$, $x_a$ is an output value of a relational expression containing a to-be-modified inverse matrix $$M_t^{-1},$$

$$x_a^T$$

is a transpose matrix of $x_a$, t is a time point, a represents an ath recommendation attempt, and $\delta$ is a constant.

17. The apparatus for configuring the computing resource of the service according to claim 11, wherein the computing resource of each service is jointly provided by a Central Processing Unit (CPU) and a Graphics Processing Unit (GPU), the processor is configured to further implement following operations when executing the computer program:

presetting a copy capacity scaling algorithm used for correspondingly determining the number of service copies of each service according to a computing request amount, a remaining CPU usage amount and a remaining GPU usage amount corresponding to each service;

determining, after the new service is put into operation, the number of target service copies of the new service using the copy capacity scaling algorithm according to an actual computing request amount, an actual remaining CPU usage amount and an actual remaining GPU usage amount corresponding to the new service; and performing capacity scaling processing on service copies of the new service according to the number of the target service copies.

18. The apparatus for configuring the computing resource of the service according to claim 11, wherein the processor is configured to further implement following operations before the online learning algorithm is applied:

training a recommendation parameter in the online learning algorithm through samples, wherein each samples is formed by a historical service on the platform and the computing resource quota adapted to the historical service.

19. The apparatus for configuring the computing resource of the service according to claim 18, wherein the processor is configured to further implement following operations when training the recommendation parameter in the online learning algorithm through the samples:

taking the historical service on the platform as input of the online learning algorithm to obtain output of the online learning algorithm, wherein the output is a recommended computing resource quota adapted to the service type of the input historical service on the platform;

determining a quota error between the recommended computing resource quota output by the online learning algorithm and the computing resource quota given in the sample and adapted to the service type of the input historical service on the platform;

modifying, according to the quota error, the recommendation parameter of the online learning algorithm to reduce the quota error.

20. A non-transitory computer-readable storage medium, storing a computer program which, when being run by a processor, is configured to cause the processor to:

preset an online learning algorithm that is used for recommending, to each service on a platform, a computing resource quota adapted to a service type of the service;

recommend, when a new service is launched on the platform during a cold start state in which a preset standard computing resource quota is not stored in a system memory, a target computing resource quota adapted to the service type of the new service according to the online learning algorithm, wherein the preset standard computing resource quota is configured to configure an initial value of a computing resource for the new service launched on the platform; and perform initial configuration for a computing resource of the new service according to the target computing resource quota;

wherein the platform is a Kubernetes platform configured to manage containerized services, the containerized services comprise the new service, and the computing resource of the new service is jointly provided by a Central Processing Unit (CPU) and a Graphics Processing Unit (GPU).

* * * * *